(12) United States Patent
Laidlaw (10) Patent No.: US 6,975,196 B1
(45) Date of Patent: Dec. 13, 2005

(54) PROCESS FOR CIRCUMFERENTIAL MAGNETIZATION OF MAGNETOELASTIC SHAFTS

(75) Inventor: John Francis Laidlaw, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/088,373

(22) Filed: Mar. 23, 2005

(51) Int. Cl.[7] .............................................. H01F 13/00
(52) U.S. Cl. ............ 335/284; 73/862.321; 73/862.333; 73/862.335
(58) Field of Search .................... 73/862.321–862.339; 335/284

(56) References Cited

U.S. PATENT DOCUMENTS

| | | | |
|---|---|---|---|
| 3,219,889 | A | 11/1965 | Polushkin |
| 4,166,263 | A | 8/1979 | Harada et al. |
| 4,168,481 | A | 9/1979 | Harada et al. |
| 5,319,335 | A | 6/1994 | Huang et al. |
| 5,659,280 | A | 8/1997 | Lee et al. |
| 5,706,572 | A * | 1/1998 | Garshelis .................. 29/602.1 |
| 6,154,352 | A | 11/2000 | Atallah |
| 6,792,817 | B2 | 9/2004 | Viola et al. |
| 6,831,540 | B1 | 12/2004 | Lin |
| 2003/0150282 | A1 | 8/2003 | May |

FOREIGN PATENT DOCUMENTS

| | | |
|---|---|---|
| JP | 02224305 A | 6/1990 |
| JP | 06140249 A | 5/1994 |

* cited by examiner

Primary Examiner—Ramon M. Barrera
(74) Attorney, Agent, or Firm—Brinks Hofer Gilson & Lione (57) ABSTRACT

An apparatus for magnetizing selected portions of a shaft in a substantially circumferential direction includes a fixture mounted onto the apparatus adapted to receive a shaft to be magnetized, at least one magnetization head, the magnetization head being mounted moveably on the apparatus such that the magnetization head can be moved radially relative to the fixture, a plurality of brushes mounted onto the magnetization head, each brush having a distal end defining an internal diameter sized to circumferentially contact the shaft, the brushes being spring-loaded such that when the magnetization head is moved toward the fixture, each brush engages the shaft with proper pre-load force, and a buss bar, wherein the brushes are electrically connected to the buss bar for even distribution of electrical current to the brushes.

18 Claims, 7 Drawing Sheets

PROCESS FOR CIRCUMFERENTIAL MAGNETIZATION OF MAGNETOELASTIC SHAFTS

FIELD OF THE INVENTION

The present invention relates to an apparatus and method for magnetizing a shaft, and more particularly to an apparatus and method for circumferentially magnetizing magnetoelastic torque transducer shafts for providing a measure of torque applied to the shaft.

BACKGROUND OF THE INVENTION

In the control of systems having rotating drive shafts, the amount of torque applied to the drive shaft is an important parameter for control feedback. Therefore, the sensing and measurement of torque in an accurate, reliable and inexpensive manner has been a primary objective. For this purpose, non-contacting magnetoelastic torque transducers have been provided.

Magnetoelastic torque transducers commonly have two features—1) a shaft which is ferromagnetic and magnetostrictive; and 2) a means for detecting or sensing the measure of torque applied to the shaft. Ferromagnetism ensures the existence of magnetic domains within the shaft and magnetostriction allows the orientation of magnetization within each domain to be altered by the stress associated with applied torque.

Torque transducers based on the magnetoelastic response to torque induced mechanical stresses require an internal remanent magnetization of a controlled profile. One type of such transducer comprises a cylindrical shaft having bands of magnetization wherein the magnetization is circumferentially directed. The bands may be either a physically separate component applied to a shaft, e.g. a ring or collar affixed to the shaft to perform the active element function, or one or more magnetoelastic regions integrated into the axial length of the shaft.

Operation of a transducer for the measurement of torque applied to a shaft requires the shaft to be magnetically polarized in a substantially purely circumferential direction. A common method of magnetizing a transducer shaft includes the use of polarizing magnets to simultaneously create two magnetically contiguous polarized regions. The number of sources of polarizing fields will in general be the same as the number of polarized regions being created. The polarizing magnets are held close to the shaft surface while the shaft is rotated on its axis in either direction in the magnetic field produced externally to the shaft from the dipole-type magnetic source of the polarizing magnets. With this technique, it is difficult to control the magnetization profile. In addition, as a practical matter, it is extremely difficult to magnetize a shaft by conventional magnetization methods using polarizing magnets to a depth greater than about 1–2 mm because it is difficult to generate a strong enough magnetic field so far from the magnetic field source, due to the change in reluctance caused by the air gap between the magnet and shaft to be magnetized.

Moreover, the use of external polarizing magnets may result in uneven magnetization where the transducer material deepest within the shaft is insufficiently magnetized, leading to degraded transducer performance, such as reduced short term and long term sensitivity and the creation of "hot-spots"—nonuniformity in the transducer response. This technique is also difficult to optimize, configure and control.

With hollow shafts of large diameter, cooperating internal as well as external polarizing magnets also may be required to obtain a uniform, full-depth polarization of the active region(s), thereby increasing the cost of the apparatus.

An alternative method of magnetizing a shaft includes providing a current in an axial direction near the shaft, directly through the shaft or through a coaxial conductor passed through the central hole of the shaft. In torque transducers of the present invention where the active region is of generally limited axial extent and is to be located at some desirable axial position along the shaft, conventional methods involving the conduction of electrical currents through the entire shaft or through coaxial conductors passing through hollow shafts are unsuitable. Unlike conventional apparatus and methods, the apparatus and method of the present invention magnetizes a length of a shaft of limited axial extent in a substantially purely circumferential direction and throughout the entire depth or thickness of the length of the shaft or width of magnetic zone wanted.

Accordingly, there is a need for an improved apparatus and method to induce circumferential magnetization into a shaft.

SUMMARY OF THE INVENTION

The scope of the invention is determined solely by the appended claims and their equivalents and is not affected to any degree by the statements within this summary.

The invention provides a method and apparatus for circumferentially magnetizing the active regions of torque transducer shafts for the measurement of torque applied to a shaft, preferably in an automotive steering mechanism. Specifically, the method and apparatus of the present invention address the disadvantages of conventional apparatus and methods of magnetizing torque transducer shafts by providing an apparatus and method that ensures substantially complete magnetization of the active regions of the transducer shaft.

In accordance with one aspect of the present invention, at least three spaced-apart brushes are provided having internal diameters sized so as to circumferentially contact the exterior diameter of the shaft. The brushes substantially surround the outer circumference of the shaft to be magnetized. The contact points of the two outer brushes are coincident with the axial ends of each of circumferential magnetic regions to be provided on the shaft. The center coupler contact points are coincident with the common center of the circumferential magnetic regions to be provided on the shaft. The brushes are in electrical contact with a buss bar that provides even distribution of electrical current to the brushes.

In one aspect, at least one high-intensity electric current pulse is applied to the central brushes. The current radially enters the shaft at a substantially 90° degree angle to the axis of the shaft and is forced axially along the length of the shaft portion comprising the active regions of the shaft in the directions of the outer brushes. The current flow produces a circumferential magnetic field inside the shaft, which leaves the material magnetized after removal of the current. The current exits the shaft through the outer brushes. The apparatus injects the current in an inherently axisymmetric manner and produces an inherently circumferential remanent magnetization in the shaft. The high-intensity of the current pulse ensures that the shaft material is magnetized throughout its thickness.

In another aspect, the at least one high-intensity electric current pulse is applied to the outer brushes and radially to the shaft. In this embodiment, the current is forced axially along the lengths of the active regions of the shaft in the direction of the center brushes. The current then exits the shaft through the center brushes.

In yet another aspect, a decaying alternating current pulse, the first mode of which flows opposite of the prior applied high-intensity pulse in each band, is then injected to stabilize the magnetization.

In still another aspect, the apparatus contains shielding to prevent magnetization of portions of the shaft that should not be magnetized.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
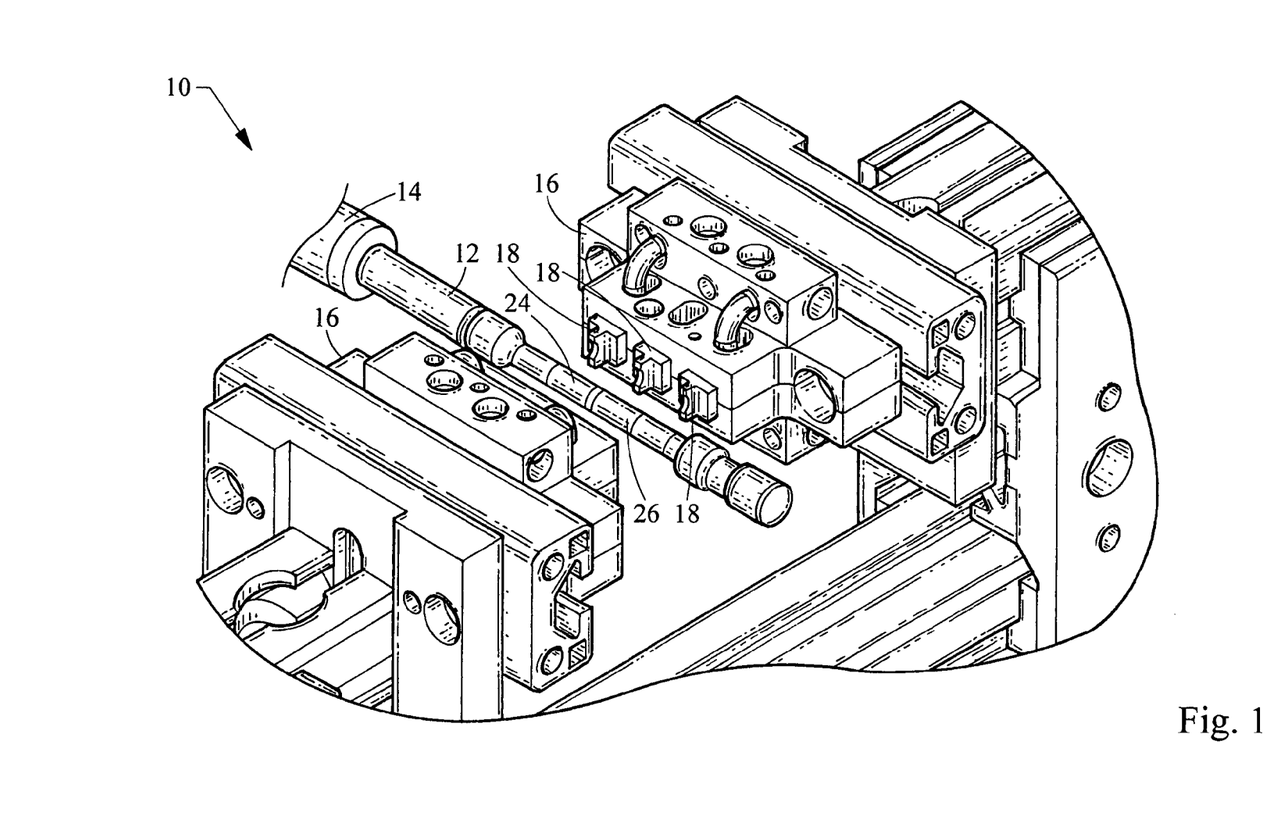
FIG. 1 is a perspective view of an apparatus in accordance with the teachings of the claims.
Figure 2:
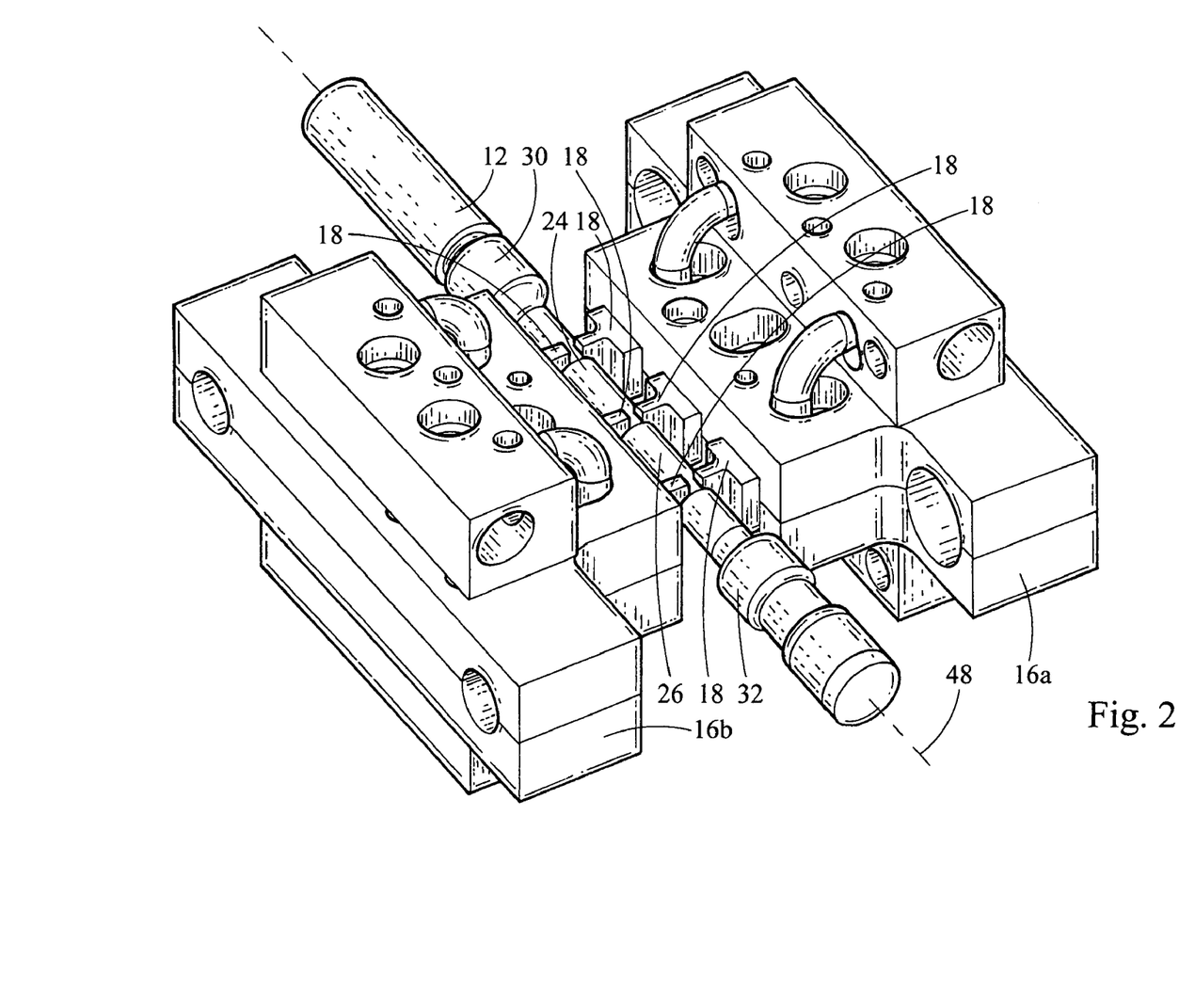
FIG. 2 is an enlarged view showing only the magnetization heads, the fixture, and the shaft, wherein the magnetization heads are engaged with the shaft.

Referring first to FIG. 1, an apparatus for magnetizing a shaft 12 in accordance with the present application is shown generally at 10. The apparatus 10 generally comprises a fixture 14 mounted onto the apparatus 10 to hold the shaft 12. The fixture can be adapted to rotate the shaft 12 to provide better uniformity of the magnetization of the shaft 12. At least one magnetization head 16 is mounted onto the apparatus 10. The magnetization head 16 is radially moveable relative to the fixture 14.

The magnetization head 16 includes a plurality of brushes 18 mounted thereon. The brushes 18 have a distal end 20 that defines an internal diameter that is sized to circumferentially engage the shaft. Preferably, the brushes 18 are spring-loaded such that when the magnetization head is moved toward the fixture, the brushes 18 will engage the shaft 12 with an appropriate pre-load.

A buss bar 22 is connected to the brushes 18 to selectively supply an electric current through the brushes 18.

The shaft 12, comprises at least one axial region, comprising at least one, and preferably two, circumferential bands or regions 24 and 26 defining the active or transducer region of the shaft 12. As shown in the Figures, at least two oppositely polarized circumferential regions 24, 26 are desired.

As shown in the Figures, the apparatus 10 includes two magnetization heads 16a, 16b and three brushes 18 mounted on each magnetization head 16a, 16b. The brushes 18 have distal ends 20 that define internal diameters sized to circumferentially contact the exterior diameter of the part of the shaft 12 to be magnetized.

Figure 3:
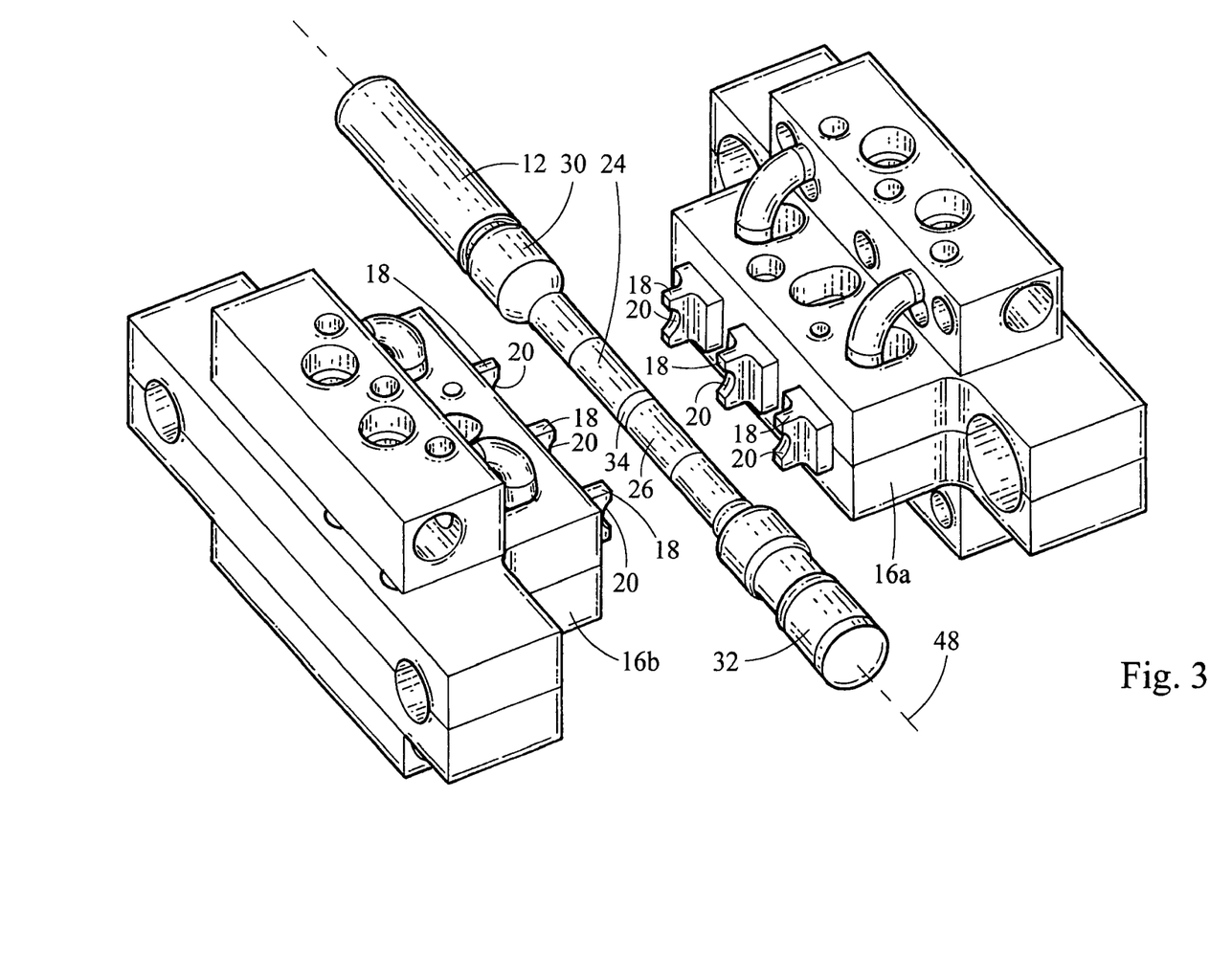
FIG. 3 is a view similar to FIG. 2 wherein the magnetization heads are retracted from the shaft.
Figure 4:
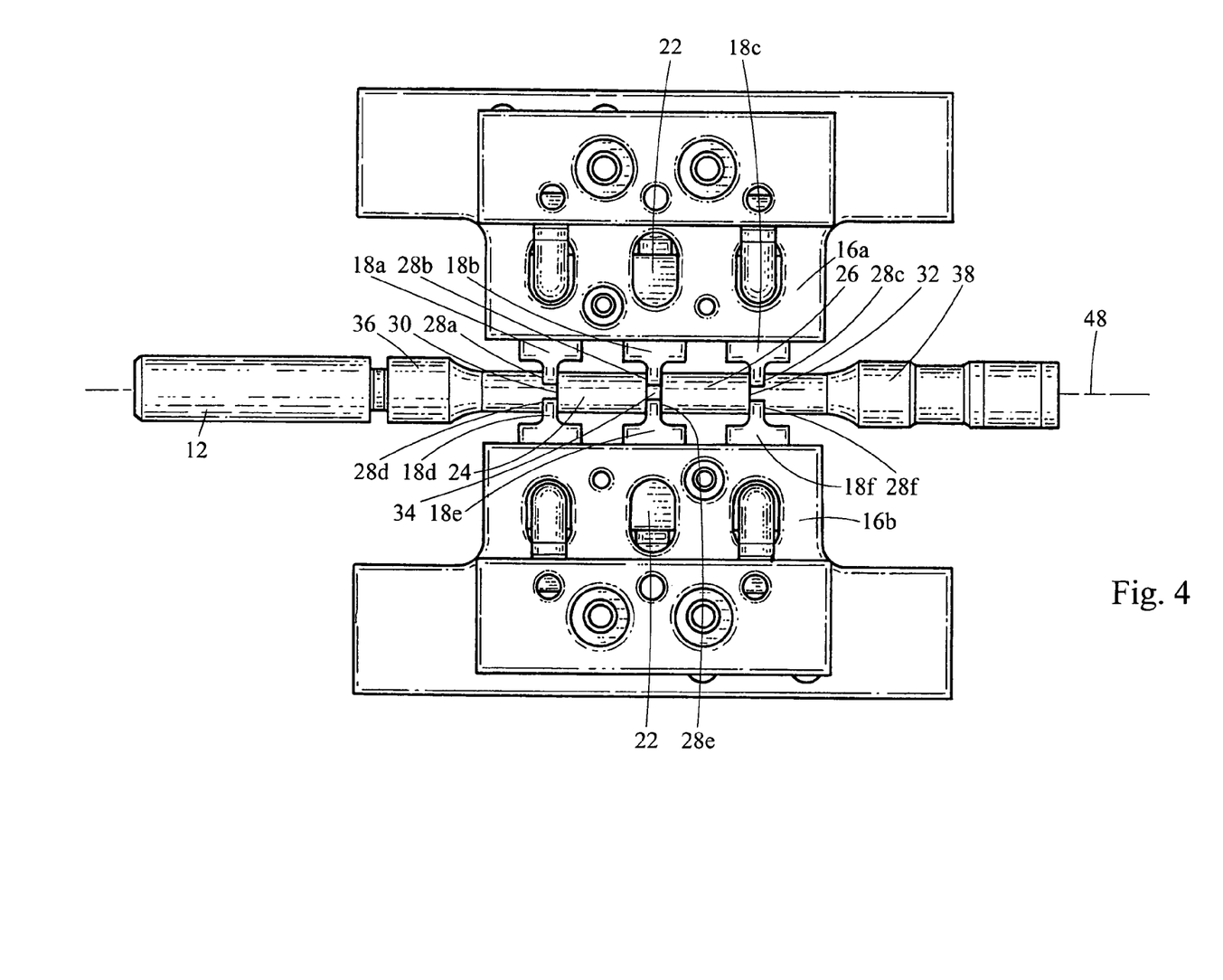
FIG. 4 is a top view of the magnetization heads engaging the shaft as shown in FIG. 2.

Referring to FIG. 3, when the magnetization heads 16a, 16b are moved toward the fixture 14, the brushes 18 contact the shaft 12. The brushes 18 substantially surround the outer circumference of the shaft 12. As shown in FIG. 4, internal contact points 28a, 28c, 28d, 28f of the brushes 18a, 18c, 18d, 18f are coincident with outer axial ends 30, 32 of each of the circumferential magnetic bands or regions 24, 26 to be provided on the shaft 12. The contact points 28b, 28e of brushes 18b, 18e substantially circumferentially surrounds the shaft 12 at the adjacent inner edges, or domain wall 34 of the regions 24, 26. The active region of the shaft 12 is defined by the existence of circumferentially directed remanent magnetization. Regions 36, 38 of the shaft 12 to the left of circumferential region 24 and to the right of circumferential region 26 differ from the active regions 24, 26 only by the absence of significant magnetization.

In a preferred embodiment, the brushes 18 enable electric current from the buss bar 22 to be directed through the brushes 18 to the shaft 12 axially and uniformly thereby creating uniform circumferential magnetic fields in each of the adjacent active regions 24 and 26.

The brushes 18a–18f can be made of any suitable material that is electrically conductive as long as it is not ferromagnetic. Suitable materials include paramagnetic and diamagnetic materials having electrical conductivity. Suitable diamagnetic materials include copper, bismuth, lead, and mercury, germanium, silver and gold. Suitable paramagnetic materials include aluminum, magnesium, titanium and tungsten.

The shaft 12 is typically formed of any suitable ferromagnetic, magnetostrictive material. The material must be ferromagnetic to assure the existence of magnetic domains and must be magnetostrictive so that the orientation of the magnetization may be altered by the stresses associated with an applied torque. Suitable materials include commonly available steels including martensitic stainless steels, precipitation hardening stainless steels, alloy steels, tool steels, and nickel maraging steels.

The active regions 24 and 26 of the shaft 12 are magnetically polarized in substantially purely circumferential direction to the extent that, at least in the quiescent state (in the absence of torque), the regions have no net magnetization in the direction of the axis 48 of the shaft 12 and has no net radial magnetization components.

Figure 5:
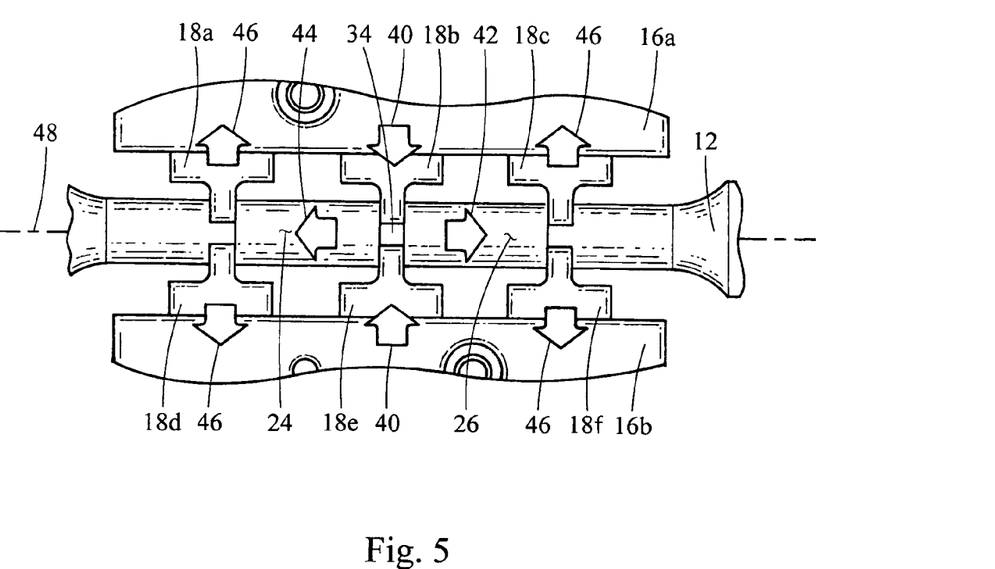
FIG. 5 is a schematic view showing the electrical current entering the shaft through inner brushes and exiting the shaft through outer brushes.
Figure 5A:
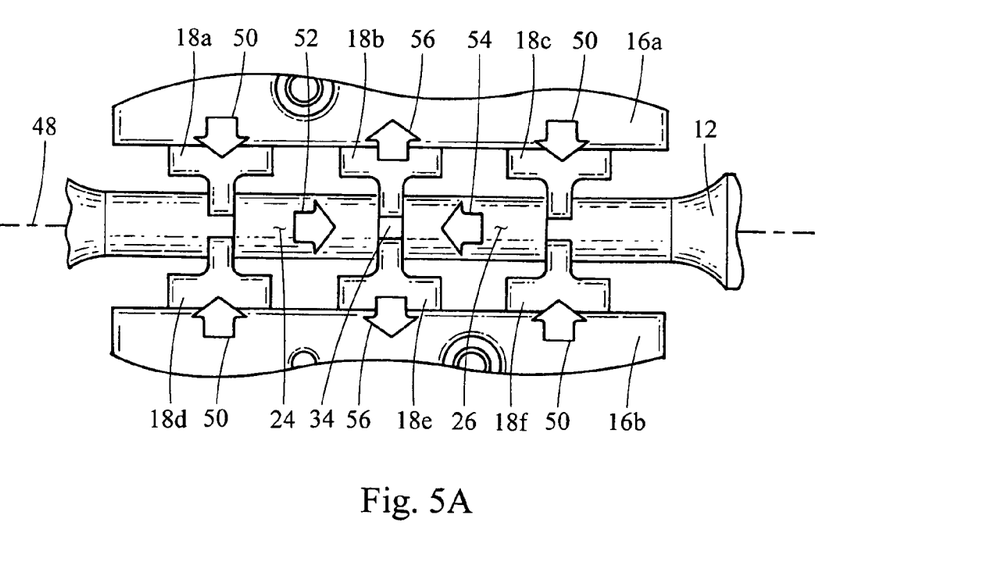
FIG. 5a is a schematic view showing the electrical current entering the shaft through outer brushes and exiting the shaft through inner brushes.
Figure 6:
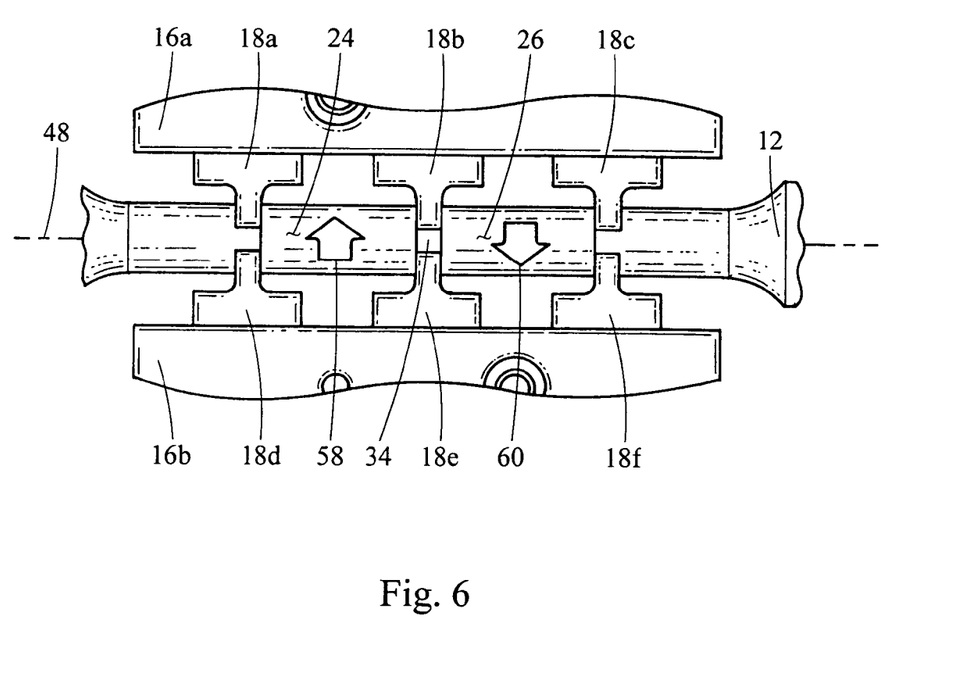
FIG. 6 is a schematic view illustrating the orientation of the magnetic fields left from the electric currents shown in FIG. 5.

FIGS. 5, 5a, and 6 illustrate the two circumferentially magnetized regions 24, 26 magnetized in opposite directions with a single transition zone 34. The width (the axial extent) of the active regions 24 and 26 generally exceeds the width of the contact points 28a–28f of the brushes 18a–18f. The transition zone 34 between the two oppositely polarized regions represents a sub-region within which the remanent magnetization undergoes a transition from one circular direction to the other. The minimum width of this region 34 is dependent upon the width of the contact point of the brushes 18b, 18e in that region. The width of this region 34 can be made as large as desired by merely increasing the width of the contact points 28b, 28e of the brushes 18b, 18e at that region.

The axial extent of the active regions 24, 26 of the shaft is determined for the most part by practical considerations, such as the region must be long enough to develop a practically useful torque induced magnetic field and appropriately sized so as to be sensed by commercially available, practically useful magnetic vector sensors. Moreover, in specific applications, the space available on the shaft 12 for implementation of the torque sensing function is limited, for example, by virtue of the proximity of non-related magnetizable material. In terms of shaft 12 diameter, a useful range of axial dimensions may be some integral multiple, e.g., four (4) times the diameter for small shafts in the 3 mm range, to one (1) times the diameter for shafts in the 20 mm range, to 0.3 times the diameter for shafts in the 100 mm range. Generally, the length of the active regions 24, 26 created by the apparatus and method of the present invention will be between 3 to 100 mm for shafts 12 between 1 and 1000 mm in diameter.

Magnetization of the desired active region of the shaft is obtained by application of an electrical current to the shaft, as shown in FIG. 5. Here, at least one electric current pulse (either capacitive or inductive) is applied to brushes 18b, 18e. In this embodiment, the current, indicated by arrows 40 in FIG. 5, enters the shaft 12 radially through the brushes 18b, 18e at a substantially 90° angle to the axis 48 of the shaft 12. Electrical current is forced axially along the lengths of active regions 24, 26 of the shaft 12 in the directions of couplers 18a, 18c, 18d, 18f, as shown by arrows 42 and 44. The current flow produces a circumferential magnetic field inside the shaft 12, which leaves the material magnetized after removal of the current. The current then exits the shaft 12 radially through outer brushes 18a, 18c, 18d, 18f as shown by the arrows 46 in FIG. 5. The apparatus injects the current in an inherently axisymmetric manner and produces an inherently circumferential remanent magnetization in the transducer shaft.

In another embodiment as shown in FIG. 5a, the high-intensity electric current pulse is applied to the outer brushes 18a, 18c, 18d, 18f. The current enters the shaft 12 as shown by arrows 50, and is forced axially along the lengths of the active regions 24, 26 of the shaft 12 in the direction of the inner brushes 18b, 18e. The current then exits the shaft 12 through the inner brushes 18b, 18e.

In the absence of torque, the magnetization in the active regions 24, 26 tends to the right hand rule. The active regions 24, 26 of the shaft shown in FIG. 5 would be magnetized as shown in FIG. 6, wherein the magnetization of region 24 is oriented as shown by arrow 58 and the magnetization of region 26 is oriented as shown by arrow 60. The currents within the active regions 24, 26 as shown in FIG. 5a run in the opposite direction, thereby resulting in opposite magnetic orientation of the active regions 24, 26.

Figure 7:
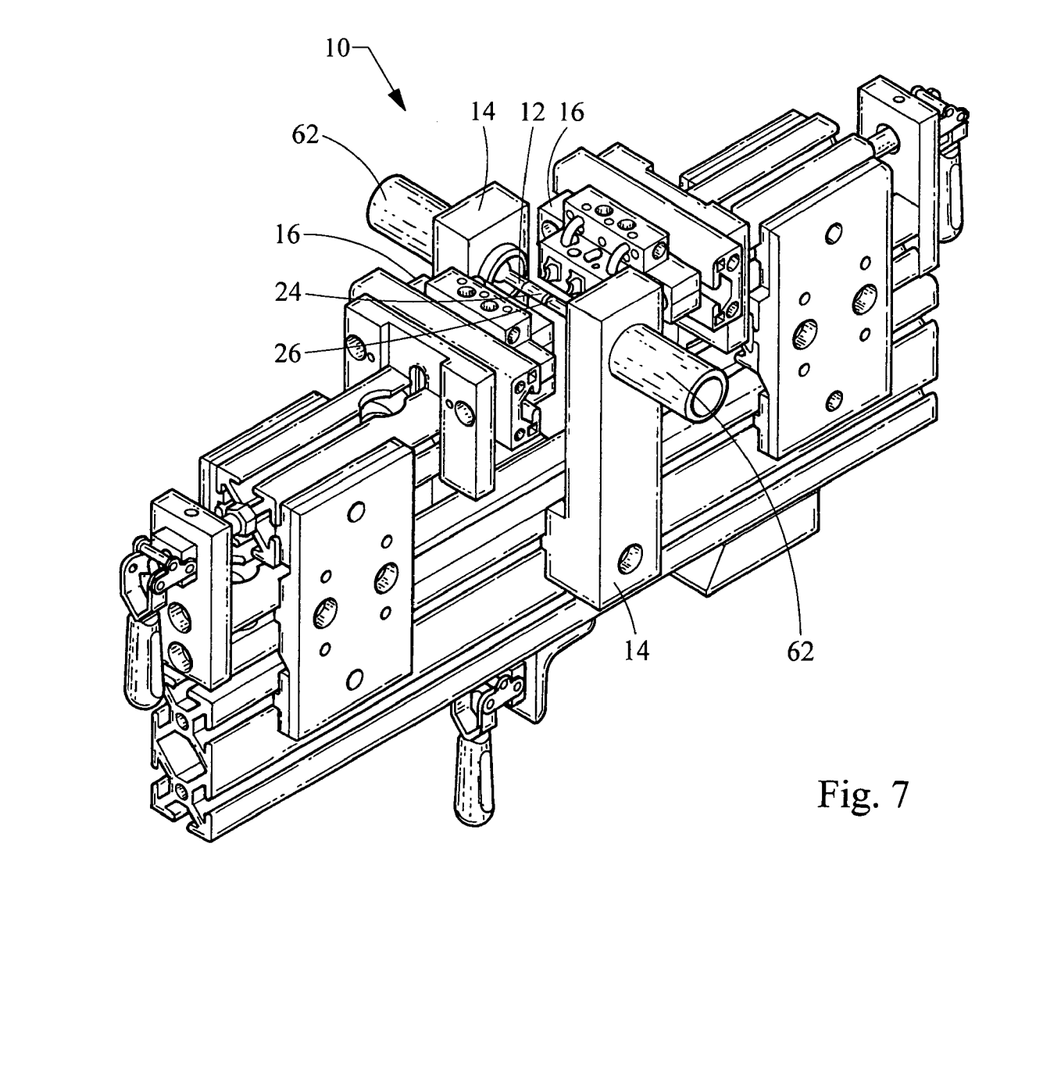
FIG. 7 is a perspective view of the apparatus including shields positioned over the ends of the shaft that is being magnetized.

Due to the close proximity of the buss bar 22 to the shaft 12 and the routing of the cables to the buss bar 22, the large current pulse may induce a slight magnetic field along the entire shaft 12. To prevent this, the apparatus contains at least one shield 62 positioned over at lease one end of the shaft 12. Referring to FIG. 7, the fixture 14 of the apparatus 10 includes a shield 62 positioned over each end of the shaft 12. The shield 62 will prevent the ends of the shaft 12 from being magnetized.

The current required to thoroughly magnetize the active regions 24, 26 in the circumferential direction is dependent upon the thickness of the shaft 12 and, assuming uniform current density, can be calculated from Ampere's law.

The path integral of B·ds around any (imaginary) closed path is equal to the current enclosed by the path, multiplied by $\beta_0$:

$$\oint B \cdot ds = \mu_0 I_{enclosed}$$

The current pulse should be sustained for a sufficient length of time to magnetize the desired transducer regions 24, 26 of the shaft 12 to the desired depth of penetration. This can be calculated from magnetic field diffusion theory. The fundamental diffusion time constant Tau is related to the relative permeability of the transducer material. The fundamental time constant Tau is defined as:

$$\tau = 1/\alpha_1 = \frac{\mu_0 \sigma d^2}{\pi^2}$$

where σ=conductivity, d = depth and $\beta_0$= permeability.

The fundamental time constant, which is the longest time constant of the series, is usually called the diffusion time constant of the system.

In yet another embodiment, a decaying alternating current pulse of smaller amplitude, the first mode of which flows opposite of the prior applied high-intensity pulse in each region 24, 26, is then injected to stabilize the magnetization. Application of the second, smaller pulse "rings" the transducer shaft, causing any magnetic domains that are marginally stable in the circumferential direction to be knocked back into a non-destructive orientation, thereby stabilizing the remnant magnetic field within the shaft.

Once an active region is created by local circumferential polarization or magnetization, the shaft may be properly characterized as a torque transducer. The active region will preferably be comprised of dual polarization.

The embodiments of the apparatus and method of the present invention provide uniform magnetization throughout substantially the entire thickness of the transducer shaft and substantially entirely in the circumferential direction with the virtual elimination of rotational variation in the magnetic field about the shaft in the quiescent state as well as under applied torque. We have further found that with the apparatus and method of the present invention there is little or no need for mechanical break-in post conditioning (mechanically exercising or twisting the shaft through applied torque) after initial magnetization.

In accordance with the provisions of the patent statutes, the present invention has been described in what is considered to represent its preferred embodiment. However, it should be noted that the invention can be practiced otherwise than as specifically illustrated and described.

What is claimed is:

1. An apparatus for magnetizing selected portions of a shaft in a substantially circumferential direction comprising:
   a fixture mounted onto the apparatus adapted to receive a shaft to be magnetized;
   at least one magnetization head, the magnetization head being mounted moveably on the apparatus such that the magnetization head can be moved radially relative to the fixture;
   a plurality of brushes mounted onto the magnetization head, each brush having a distal end defining an internal diameter sized to circumferentially contact the shaft, the brushes being spring-loaded such that when the magnetization head is moved toward the fixture, each brush engages the shaft with proper pre-load force;
   a buss bar, wherein the brushes are electrically connected to the buss bar for even distribution of electrical current to the brushes.

2. The apparatus of claim 1 wherein the brushes further comprise electrically conductive, nonferromagnetic material.

3. The apparatus of claim 2 wherein the electrically conductive, nonferromagnetic material is selected from the group consisting of diamagnetic and paramagnetic materials.

4. The apparatus of claim 3 wherein the diamagnetic material is selected from the group consisting of copper, bismuth, lead, mercury, germanium, silver and gold.

5. The apparatus of claim 3 wherein the paramagnetic material is selected from the group consisting of aluminum, magnesium, titanium and tungsten.

6. The apparatus of claim 1 wherein the fixture is adapted to rotate the shaft.

7. The apparatus of claim 1 further including at least one shield positioned over at least one end of the shaft.

8. An apparatus for magnetizing selected portions of a shaft in a substantially circumferential direction comprising:
 a fixture mounted onto the apparatus adapted to receive a shaft to be magnetized, the fixture adapted to selectively rotate the shaft therein;
 first and second magnetization heads, the magnetization heads being mounted moveably on the apparatus such that the magnetization head can be moved radially relative to the fixture;
 a plurality of brushes mounted onto each of the magnetization heads, each brush having a distal end defining an internal diameter sized to circumferentially contact the shaft, the brushes being spring-loaded such that when the magnetization head is moved toward the fixture, each brush engages the shaft with proper preload force;
 a buss bar, wherein the brushes are electrically connected to the buss bar for even distribution of electrical current to the brushes.

9. The apparatus of claim 8 wherein the brushes further comprise electrically conductive, nonferromagnetic material.

10. The apparatus of claim 9 wherein the electrically conductive, nonferromagnetic material is selected from the group consisting of diamagnetic and paramagnetic materials.

11. The apparatus of claim 10 wherein the diamagnetic material is selected from the group consisting of copper, bismuth, lead, mercury, germanium, silver and gold.

12. The apparatus of claim 10 wherein the paramagnetic material is selected from the group consisting of aluminum, magnesium, titanium and tungsten.

13. The apparatus of claim 8 further including at least one shield positioned over at least one end of the shaft.

14. A method of magnetizing at least one selected region of a shaft in a substantially circumferential direction comprising:
 providing an apparatus for magnetizing a shaft;
 placing a shaft within a fixture on the apparatus;
 moving a magnetization head such that brushes mounted on the magnetization head and having an interior diameter spaced to circumferentially surround an outer circumference of the shaft to be magnetized contact the shaft;
 directing an electrical current through a first one of the brushes;
 directing the current radially from the first brush to the shaft,
 conducting the electrical current axially through a length of the shaft,
 directing the current radially from the shaft to a second one of the brushes circumferentially surrounding the outer circumference of the shaft,
 exiting the current from the second brush;
 removing the current source from the first brush; and
 retracting the magnetization head away from the magnetized shaft and removing the magnetized shaft from the fixture.

15. The method of claim 14 further including rotating the shaft as the current is directed axially through the shaft.

16. The method of claim 14 wherein the current source is selected from the group consisting of a single high-intensity capacitive pulse or a single high-intensity inductive pulse.

17. The method of claim 16 wherein a decaying alternating current pulse having a first mode that flows opposite that of the prior applied high-intensity pulse is then injected to stabilize the magnetization.

18. The method of claim 14 further including shielding the ends of the shaft.

* * * * *